United States Patent Office 3,605,791
Patented Sept. 20, 1971

3,605,791
VALVE ASSEMBLY FOR AND METHOD OF FITTING PRESSURIZED SPRAYING CONTAINERS
Yves Le Troadec, Mont-Saint-Aignan, France, assignor to Rhone-Poulenc S.A., Paris, France
Filed Apr. 21, 1969, Ser. No. 817,818
Claims priority, application France, July 15, 1968, 159,238
Int. Cl. B65b 3/04
U.S. Cl. 137—316   6 Claims

ABSTRACT OF THE DISCLOSURE

The specification describes a valve assembly for a pressurized spraying container. The body of the valve is provided with an external tubular extension or sleeve in which is temporarily located the valve member. The sleeve is used to guide fluid under pressure into the container and may also be used during the blow moulding of the container. When the container is filled, the valve member is forced through the sleeve into engagement with its valve seat, where it is retained by an already positioned spring, and the sleeve is detached.

---

The present invention relates to a valve assembly and a method of filling a pressurized spraying container of the type presently known as "aerosal sprays."

In particular, the invention is concerned with a valve permitting the filling of the container, and also permitting the blow moulding of the container if the latter is formed of thermoplastics material.

It has already been proposed to form a valve which permits the container to be filled and also permits blow moulding of the container through the valve body. In this construction, the nozzle of the valve is placed in position after the blow moulding and preferably after the filling of the container.

According to the present invention, there is provided a valve assembly for pressurized spraying containers, such valve assembly comprisnig a valve body having a passageway therethrough, an annular valve seat within said passageway, a detachable sleeve mounted on said body and coaxial with said passageway, a valve member releasably located by retainers within said sleeve, movable therefrom into said passageway and beyond said valve seat to form an openable seal on said valve seat, and openings in said retainers to permit the free passage of fluid under pressure, past said valve member into said passageway, when the valve member is held in the sleeve by the retainers.

With such a construction, it is possible to insert an injection tube for supplying a material to be filled into the container, into the detachable sleeve, the valve member being located therein. Thus, if the valve is mounted in the container already, it is easy to inject the material into the container.

According to a further aspect of the present invention therefore there is provided a method of manufacturing a filled pressurized spraying container in which the valve assembly of the invention is mounted in a container, with the valve body sealed to the container walls, and a passageway communicating with the container interior, fluid being injected through the sleeve, past the valve member, through the openings and passageway and into the container interior, the valve member then being forced from the sleeve into the passageway beyond the valve seat to seal on the valve seat, the sleeve then being detached from the valve body.

If it is desired to blow mould the container itself, the valve assembly is first introduced into a parison in an open blow mould, the blow mould is closed to seal the parison onto the valve body, blowing fluid is injected through the sleeve, past the valve, through the openings and passageway, into the interior of the parison, to blow mould a container. Next the container is filled as aforesaid, and the valve member is forced from the sleeve into the passageway beyond the valve seat to seal on the valve seat and the sleeve is then detached from the valve body.

In order that the invention may more readily be understood, the following description is given, merely by way of example, reference being made to the accompanying drawings, in which.

Figure 1:
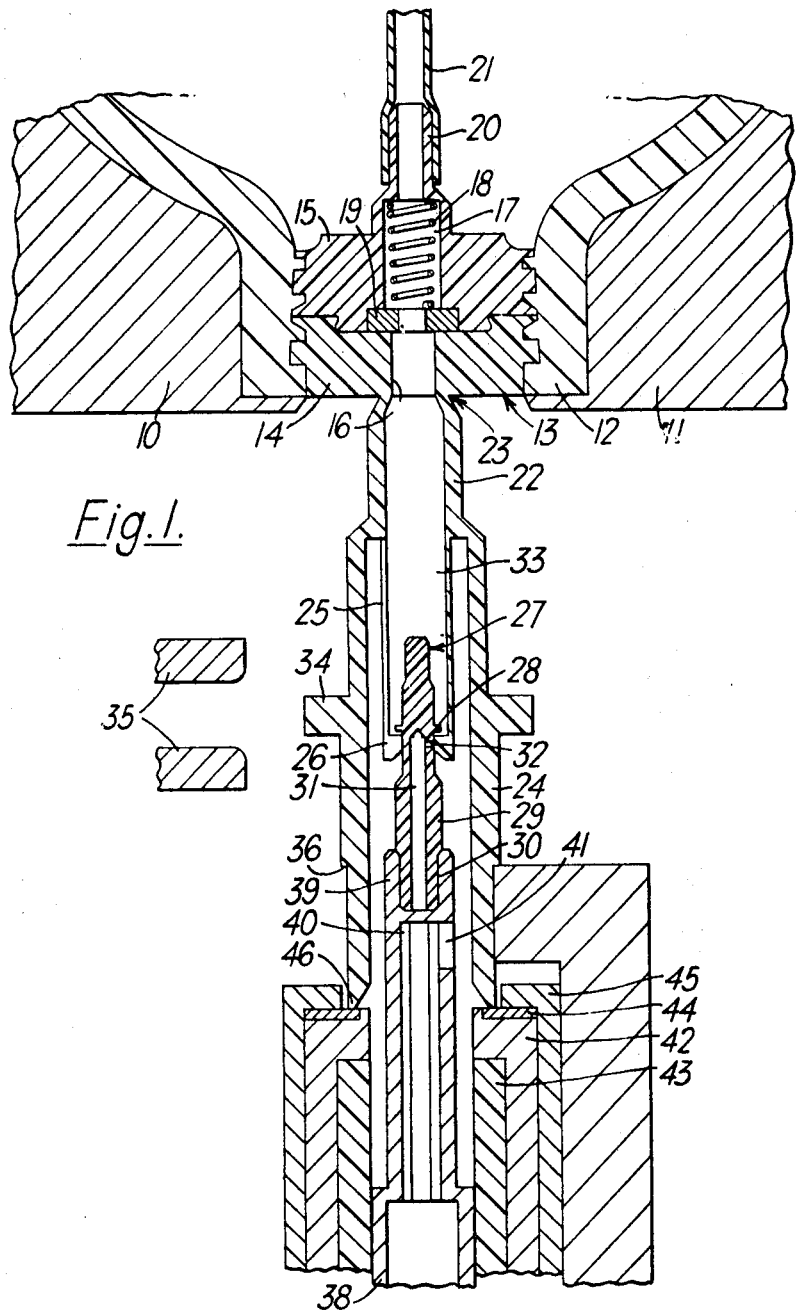
FIG. 1 is a fragmentary cross-section through one embodiment of valve assembly according to the invention, shown positioned in the neck of a container.

Referring to FIG. 1 of the drawings, there is illustrated a pair of blow mould halves 10 and 11, in the closed position, these being movable to an open position by movement in the direction of the two arrows. Located within the mould halves is a parison which has been blow moulded to the shape of a container. Secured in the neck 12 of said container during moulding is a valve body 13 which includes an upper part 14 and a lower part 15. It will be appreciated that in the figure the whole assembly is shown in its actual inverted position.

A passageway 16 extends through the body 13 and this includes a widened portion 17, which accommodates a spring 18 and an annular resilient valve seat member 19. An extension 20 to the body, which is connected to the passageway 17, serves to support a dip tube 21, intended to extend into liquid to be contained within the container (of which only the neck portion is shown) when the filled container is in the upright position.

Integral with the upper member 14 of the valve body is a sleeve 22 which is only connected to the upper member by a thinned zone 23. The sleeve includes a widened portion 24 in which are located parallel spaced apart axially extending fingers 25 having, at their free ends, radially inwardly extending lugs 26.

Supported by the lugs 26 is a valve member 27 having an annular portion 28 which serves, finally, as will be described later, to abut the annular valve seat 19, to close the valve. The valve member has a thickened portion 29 which is of substantially the same diameter as the portion of the passageway 16 in the upper part 14 of the valve body to guide the latter, and at its upper end the valve 27 is formed with a slightly narrower portion 30. As can be seen, a blind bore 31 extends axially along a substantial part of the valve 27 and is connected to the exterior by an orifice 32. The space 33 between the fingers 25 is sufficient to accommodate both the annular portion 28 and the thickened portion 29 on the valve 27, when the latter is subsequently moved longitudinally of the sleeve 22.

An annular projection 34 on the outer surface of the sleeve 22 is positioned to be held by grippers 35, associated with the moulding apparatus, and a shoulder 36 is arranged to be supported on a support 37.

The blowing tube 38 is arranged so that a cup 39 at the end thereof extends within the sleeve 22 and is engaged by the portion 30 of the valve member 27. An axial blind bore 40 in the tube communicates with the interior of the sleeve 22 by way of lateral orifices 41.

In order to guide the tube 38 axially, the tube is surrounded by a guide tube 42 having an internal lining 43 formed of a self-lubricating polymer, such as polytetrafluoroethylene. At its end, the guide tube is provided with an annular seal 44 secured by a clamping ring 45, while the free end of the sleeve 22 is tapered at 46 to seal on the ring 44.

In use of the above described assembly, the sleeve 22 is mounted so that the shoulder 36 engages on the top of the support 37, with the portion 30 of the valve member 22 located in the cup 39 on the tube 38. This arrangement is positioned below an extruder for producing a tubular parison. With the mould halves 10 and 11 open, a suitable parison is extruded and the mould halves are closed to the position illustrated in the figure, so that the neck 12 of the parison is clamped into engagement with the annular ribs and grooves formed on the outer surfaces of the two valve body members 14 and 15. The position of the various components is then as illustrated in FIG. 1 and the gripping members 35 are moved to engage the annular projection 34.

Blowing fluid is injected through the tube 38 and passes out through the lateral orifices 41 into the sleeve and then through the openings between the fingers 25 to pass into the passageway 16, into the enlargement 17 thereof, into the dip tube 21 and thence into the parison. The pressure of the fluid expands the parison to the shape of the mould halves to form a container, e.g. a bottle. Then the fluid with which it is intended to fill the thus formed container may be injected until the container is filled.

Subsequently, the tube 38 is moved axially, upwardly as seen in FIG. 1, and takes with it the valve member 27 which is guided by the fingers 25. The valve member continues to move forward and passes through the annular valve seat 19, which is sufficiently resilient to permit this, and abuts the spring 18 in the enlarged portion 17 of the passageway.

The tube 38 may then be withdrawn, leaving the valve member 27, so that the enlarged portion 28 thereof is engaged above the valve seat 19, and is urged thereagainst by the spring 18. The sleeve 22 may then be detached from the valve body 13 cutting at the thinned zone 23.

The thinner portion 30 of the valve member 27 will then project beyond the free surface of the valve body 13, and a spray cap (not shown) can be fitted thereon. The filled container is then ready for use, depression of the spray cap removing the annular portion 28 from the valve seat to allow fluid to escape via the orifice 32 and the bore 31 in the valve member. When the cap is released, the spring 18 will again urge the annular portion 28 to close the valve.

It will be appreciated that with the construction described it is easy to fill and/or to form the container rapidly, since the free passage for fluid through the various components is considerable. After this has been done it is relatively easy to fit the valve member into the valve body. If the blow moulding is not to be followed by filling on the same apparatus, the tube 38 may be integral with the tube 42, since it does not have to push the valve member beyond the valve seat.

Figure 2:
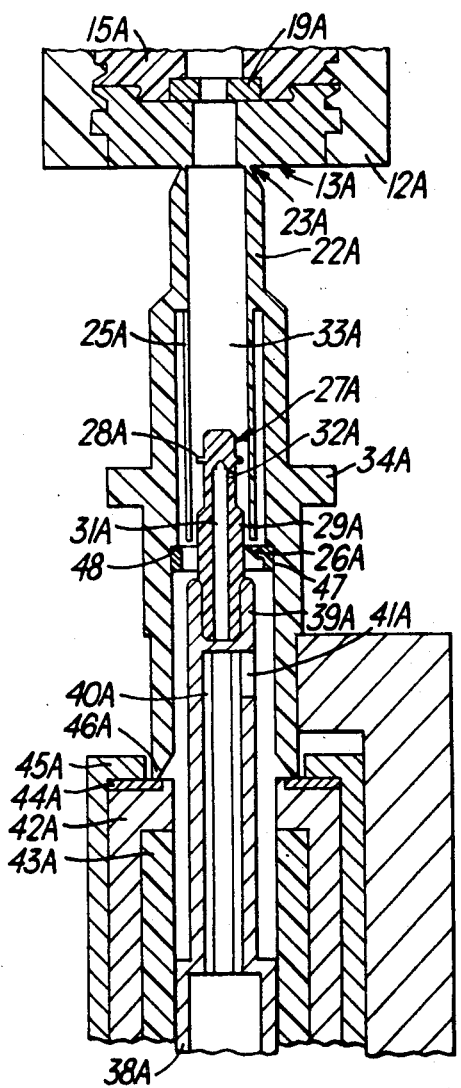
FIG. 2 is a view similar to FIG. 1 of a second embodiment of assembly according to the invention.

FIG. 2 illustrates a construction which is generally similar to that of FIG. 1, and like parts have been given like reference numerals with the addition of the letter "A." The main difference of the embodiment of FIG. 2 from that of FIG. 1 is that the fingers 25A do not have the radially inwardly extending lugs 26 thereon. Radially inwardly extending lugs 26A are however formed on a ring member 47, integral with the valve member 27A and which is retained against axial displacement by a shoulder 48 on the sleeve 22A.

Figure 3:
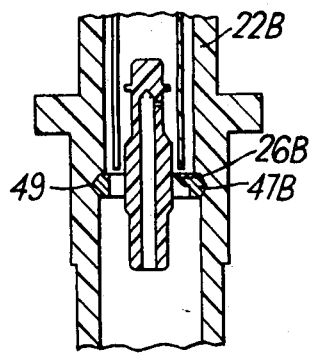
FIG. 3 is a fragmentary view illustrating a modification of the construction of FIG. 2.

FIG. 3 illustrates a similar construction in which a ring 47B has its outer surface double tapered to provide a rib 49 which engages in a corresponding annular V-section groove in the sleeve 22B.

Figure 4:
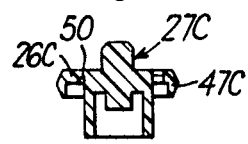
FIG. 4 is a fragmentary section through a modified form of the valve member.
Figure 5:
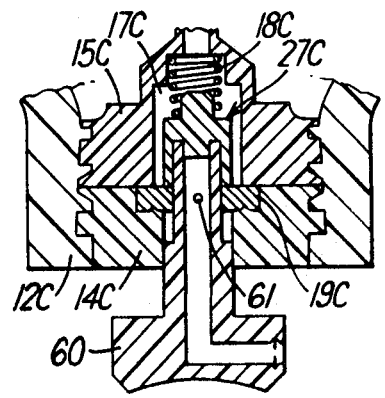
FIG. 5 illustrates the valve member of FIG. 4 in place in its valve body.

FIGS. 4 and 5 show a similar ring 47C with a valve 27C formed integrally therewith. The lugs 26C are integral with both the ring 47C and the valve member 27C, a weakening 50 being formed in each lug adjacent the valve member. With such a construction a pusher-cutter arrangement, similar to the cup 39 of FIG. 1, first presses against the lugs 26C, so that these lugs are cut at the weakening, and then forces the valve 27C through the resilient annular valve seat 19C (FIG. 5) until it is engaged by the spring 18C in the chamber 17C. A composite spray head-nozzle 60 is then inserted as shown and is then depressible to a position in which an orifice 61, corresponding to orifice 32 of FIG. 1, is within the chamber 17C, to permit fluid under pressure to discharge.

Figure 6:
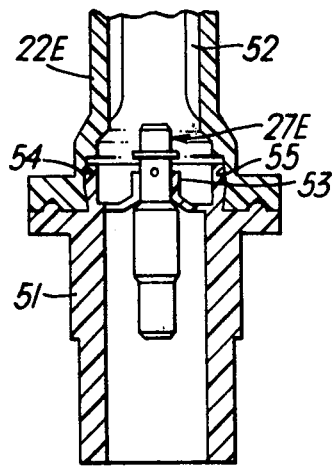
FIG. 6 illustrates a further embodiment of valve assembly.

In the construction of FIG. 6, the sleeve 22E is formed in two parts, one part having radially inwardly extending spaced apart parallel axial ribs 52. The other part 51 is provided with the spider 53 which serves to support the valve member 27E. The surfaces 54 and 55 of the part 51 and the part 22E of the sleeve are correspondingly shaped to engage in one another in a sealing tight manner. Such a part 51 may be reused many times.

Figure 7:
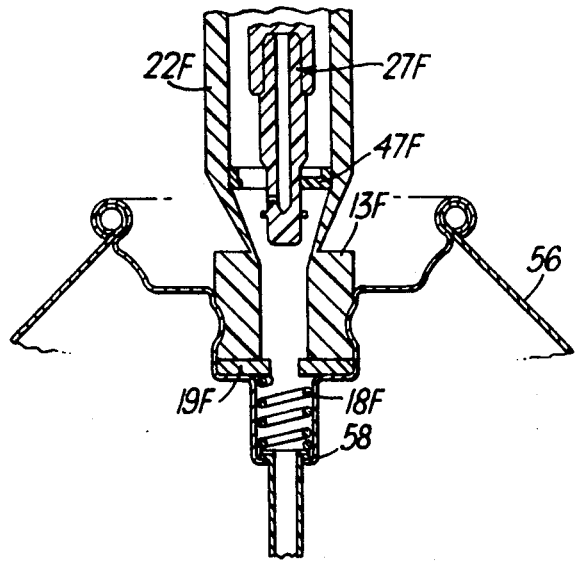
FIG. 7 is a similar view illustrating a valve assembly according to the invention secured in the neck of a metal container.

The construction of FIG. 7 is extremely similar to that of FIG. 2. In this construction, however, the container is not a blow moulded thermoplastic container, but an already formed metallic container 56 such as a can, provided with a closure member 57. The valve body in this construction includes a thermoplastic portion 13F and a recessed part 58 of the lid 57. Between these components is inserted a spring 18F and an annular valve seat member 19F. The sleeve 22F which is integral with the part 13F of the valve body, accommodates a ring 47F to support the valve member 27F. In this construction the whole assembly is inverted, since it is not necessary to extrude the parison downwardly.

It will be appreciated that a thermoplastic container may be used other than the one which is blow moulded in the manner indicated, with a valve assembly according to the invention.

I claim:
1. A valve assembly, said assembly comprising, in combination:
   (a) a valve body;
   (b) means defining a passageway through said valve body;
   (c) an annular valve seat within said passageway;
   (d) a detachable sleeve mounted on said body externally thereof and coaxial with said passageway;
   (e) a valve member releasably located within said sleeve, and movable therefrom into said passageway and beyond said valve seat, effective to form an openable seal on said valve seat;
   (f) retaining means locating said valve member in said sleeve; and
   (g) means defining openings in said retaining means effective to permit the free passage of fluid under pressure past said valve member into said passageway, when said valve member is held in said sleeve by said retaining means.

2. The valve assembly defined in claim 1, wherein said retaining means comprise radial lugs integral with said sleeve.

3. The valve assembly defined in claim 2, wherein said sleeve is formed with integral, internal, parallel, spaced apart axial fingers and wherein said lugs are integrally formed on said fingers.

4. The valve assembly defined in claim 1, wherein said retaining means comprise radial, spaced-apart lugs integral with said valve member.

5. The valve assembly defined in claim 1, and further comprising a ring located in said sleeve, wherein said retaining means comprise radially inwardly extending lugs on said ring.

6. The valve assembly defined in claim 1, and further comprising a weakened zone to said sleeve adjacent said valve body.

References Cited
UNITED STATES PATENTS

| | | | |
|---|---|---|---|
| 2,947,904 | 8/1960 | Focht | 53—88X |
| 3,204,387 | 9/1965 | Scheindel | 53—88 |

M. CARY NELSON, Primary Examiner

M. O. STURM, Assistant Examiner

U.S. Cl. X.R.

53—88; 141—20; 251—144